INVENTOR.
GEORGE W. DERRICKSON.
BY
ATTORNEY.

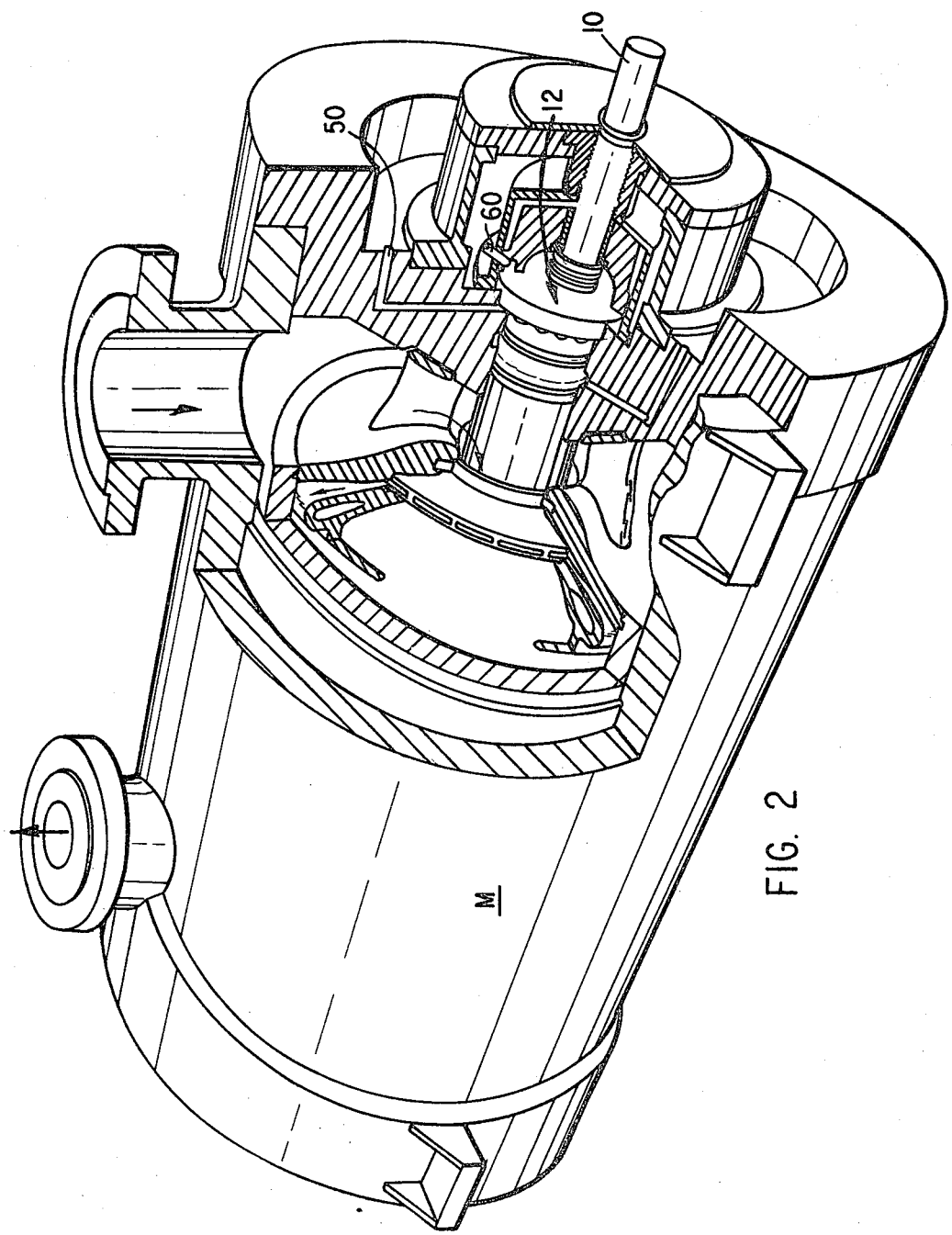

United States Patent Office 3,539,270
Patented Nov. 10, 1970

3,539,270
METHOD OF AND APPARATUS FOR LUBRICATING AND COOLING A ROTARY SHAFT SEAL ASSEMBLY
George W. Derrickson, Greensburg, Pa., assignor to Carrier Corporation, Syracuse, N.Y., a corporation of Delaware
Filed Mar. 14, 1968, Ser. No. 712,977
Int. Cl. F04d 29/00; E21b 33/00; E16i 15/00
U.S. Cl. 415—1
6 Claims

ABSTRACT OF THE DISCLOSURE

A lubricating and cooling system for a shaft sealing assembly in an elastic fluid machine where it is desired to prevent leakage of the fluid from the machine, the system being operable to maintain a predetermined pressure drop across a running seal section of the assembly while satisfying the lubrication and cooling requirement of a pressure breakdown or reduction section of the assembly. The system includes an arrangement for introducing fluid into and exhausting fluid from the sealing assembly in a different flow path under different machine operating pressures.

BACKGROUND OF THE INVENTION

This invention relates generally to rotating machinery. More particularly, this invention relates to rotating machines such as compressors or turbines wherein gas is passed through the machine to either extract energy from or impart energy thereto.

Machines of the type to which this invention pertains include a main power shaft driven at substantially constant speed, together with bearings for mounting the shaft within a casing or housing and sealing assemblies for either preventing or inhibiting the escape of gas from the machine. The sealing assemblies employed with machines of the kind described are subjected to heat caused by the frictional engagement of the power shaft runner with stationary parts of the sealing assemblies. Accordingly, it is necessary to supply a cooling fluid for flow through the sealing assemblies in order to dissipate the heat so generated and at the same time provide lubrication to the parts.

In rotary machines such as centrifugal gas compressors the pressure levels at which the gas enters and departs the compressor is relatively high. It is necessary under these circumstances to supply cooling fluid at a pressure in excess of that encountered within the machine so that leakage of gas from the machine will be resisted. The cooling medium is caused to leak inwardly of the seal assembly toward the interior of the casing for eventual collection and recycle through the cooling medium flow circuit. Because of the relatively high pressures at which the cooling fluid is supplied to the sealing assembly provision must be made for reducing the pressure of the fluid after it has traversed the parts of the sealing assembly that require cooling and lubrication. To this end, one or more floating bushings are provided in which the power shaft is mounted. A clearance space is provided between the interior surface of the bushing and the power shaft or sealing sleeve for the flow of cooling fluid from the sealing assembly to a lower pressure such as atmospheric pressure. The bushings are effective to reduce the pressure of the cooling fluid in stages. Therefore, the number of bushings involved is usually related to the pressures at which the cooling fluid must be supplied.

In addition to the means for reducing the pressure of the cooling fluid, the actual sealing of the gas within the compressor is accomplished through a running seal which may consist of a member having a stationary sealing surface, a carbon ring having a first surface in engagement with the sealing surface on the stationary member and a second surface in engagement with a sealing ring secured to the power shaft. It will be appreciated that the carbon ring interposed between the stationary and rotary elements described will require lubrication and cooling in order to dissipate the heat generated by the frictional force created when rotary motion is imparted to the power shaft. As indicated above, it is desirable that relatively small portions of the cooling fluid be permitted to flow across the inner engaging surfaces so as to end up inwardly of the carbon ring. This is accomplished by regulating the pressure of the cooling fluid in accordance with the pressure of the gas inwardly of the carbon ring.

In a sense the sealing assembly includes two separate lubrication requirements. The bushings described above require lubrication and cooling and are designed so that a pressure drop on the order of 175 to 250 p.s.i. is required of the cooling fluid in order to achieve proper lubrication and cooling. The parts of the running seal portion of the sealing assembly are designed so that when the compressor operates within its design range, cooling fluid is available through a main supply conduit or passage at a pressure drop across the carbon seal of about 50 p.s.i. When the machine is required to process gas at low suction pressures, that is at suction pressures below the lower limit of its design operating range, certain problems are encountered. For example the pressure of the lubricant drops as the suction pressure drops, for to permit it to exceed a predetermined pressure of the gas within the machine to satisfy the requirement of the bushings would impose a pressure differential across the surfaces of the sealing rings and the carbon ring of a magnitude to cause separation of the parts resulting in vibration or chatter which may lead to the eventual destruction of the carbon ring. However, as the pressure of the cooling fluid supplied to the sealing assembly is reduced to maintain the pressure difference of 50 p.s.i., insufficient lubrication and cooling of the bushing subassembly ensues.

A primary object of this invention is the provision of a system for supplying cooling fluid to the sealing assembly of a high pressure gas machine so that adequate cooling and lubrication of the components of the sealing assembly may be accomplished under a variety of pressure conditions without jeopardizing any of the coponents including the carbon ring sealing element.

A second object of this invention involves the provision of a cooling and lubricating system for a sealing assembly of the kind described in which cooling fluid is supplied to the assembly in different directions and from a different source depending upon the pressure of the gas being processed by the machine incorporating the sealing assembly.

SUMMARY OF THE INVENTION

This invention involves the provision of a cooling and lubricating system for a shaft sealing assembly in which a first fluid at a predetermined pressure in excess of the suction pressure of the machine is supplied to the assembly so that controlled leakage across and proper lubrication of all sealing elements is maintained. In addition, the cooling and lubricating system includes an arrangement for introducing a second cooling fluid at a predetermined pressure relative to atmospheric pressure to assure proper lubrication of all parts of the sealing assembly when the pressure developed by the first fluid is insufficient to accomplish proper lubrication.

DESCRIPTION OF THE DRAWING

FIG. 2 is a perspective view of a machine of the kind to which the invention pertains in which certain of the parts have been broken away.

DESCRIPTION OF THE PREFERRED EMBODIMENT

Figure 1:
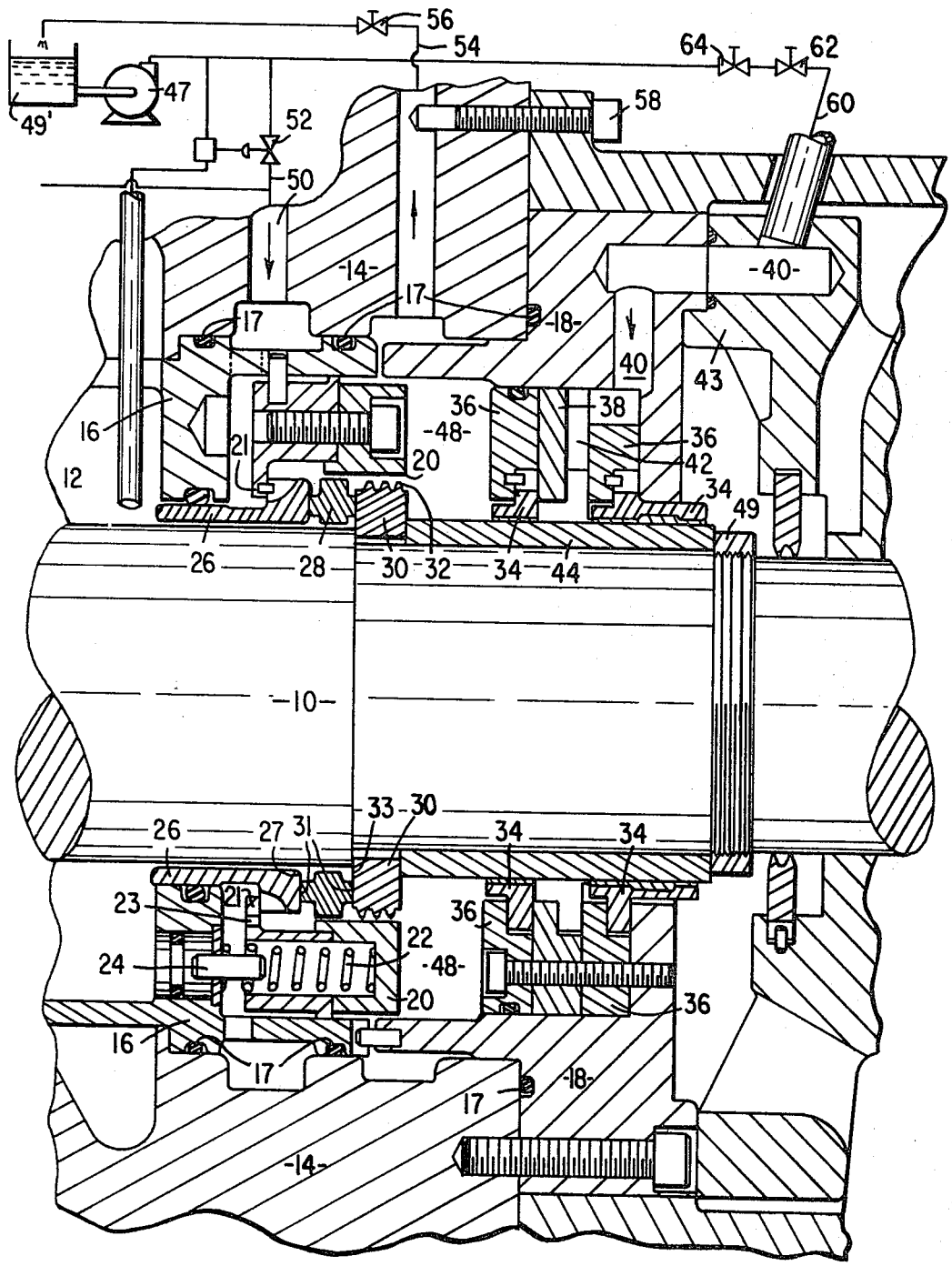
FIG. 1 illustrates a portion of a rotary machine including the sealing assembly in section and a portion of the cooilng fluid circuit together with control members therefor represented schematically.

The cooling and lubricating system forming the subject of this invention may be used with power driven rotating machines which require a sealing assembly in addition to the normal shaft bearing assemblies. For the purpose of describing the invention, reference will be made to a multi-stage centrifugal gas compressor which receives gas through an inlet and exhausts it through an outlet. The compressor includes a power driven shaft mounted in bearing and sealing assemblies incorporated in the housing or casing for the compressor. A plurality of impellers, arranged in series, receive the gas at the inlet of the machine, elevate the pressure of the gas, and discharge it through the outlet of the machine. In many instances, the nature of the gas processed by the centrifugal compressor described require that the gas be prevented from leaking from the machine. To this end, sealing assemblies to which cooling and lubricating fluid must be supplied, are employed. The pressure at which the fluids is supplied is in excess of that of the suction gas being processed so that those elements of the sealing assembly subject to gas pressure will have a pressure differential thereacross which causes leakage of the cooling fluid into the interior of the compressor.

FIG. 2 illustrates a machine of the type described and includes a sealing assembly, note FIG. 1, comprising two major parts or sub-assemblies. The first major part incorporates the carbon ring seal and the second major part incorporates a series of bushings employed for the purpose of reducing in stages the pressure of the cooling fluid as it exhausts from the sealing assembly to a reservoir provided for the purpose of accommodating or storing the cooling fluid.

The power shaft 10 of the machine M is mounted within bearing assemblies, not shown, disposed outwardly of the sealing assembly 12. The sealing assembly is disposed within the casing 14 by mounting blocks 16 and 18 together with O-rings 17. It will be appreciated mounting blocks 16 and 18 and the annular end members may be segmented for convenience in assembly. Arranged within mounting blocks 16 is a spring retainer assembly 20 for accommodating circumferentially spaced spring members 22 disposed about centering pins 24. Spring retainer 20 is provided with a flange 21 having openings 23 for a purpose to be later described. With the construction shown, the spring retainer 20 resiliently urges stationary sealing ring 26 mounted in block 16 in a forward direction.

Mounted on shaft 10 for rotation therewith is an annular sealing ring 30. Interposed between the annular sealing member 30 and the stationary ring 26 is a carbon ring 28 arranged to encircle shaft 10. Carbon ring 28 includes sealing surfaces 31 for engagement with sealing surface 27 on stationary ring 26 and sealing surface 33 on annular sealing ring 30. Spiral ridges 32 are disposed about the outer periphery of ring 30 so as to induce cooling fluid to flow across the sealing assembly and over the surfaces 31 and inwardly of the machine under normal operating conditions.

Likewise mounted on shaft 10 for rotation therewith is sleeve member 44. Disposed about the sleeve 44 are annular bushing members 34 each having the interior surface thereof provided with a babbit liner. The bushings 34 form the second major part of the sealing assembly and are arranged within bushing mounting blocks 36 in the manner shown in FIG. 1. An annular spacer ring 38 is interposed between mounting blocks 36 and includes passages 42 communicating with passage 40 in block 18 and end cap 43. The bushings 34 are provided for the purpose of reducing the pressure of the cooling and lubricating fluid as it flows from a chamber 48 to the right of the assembly along a clearance space between bushings 34 and sleeve 44. A nut 49 is threadably mounted about the shaft 10 to secure the parts in the position shown.

In order to assure proper lubrication of the moving parts of the sealing assembly and to assure that the heat generated by the movement be removed, a cooling fluid such as oil is supplied from a pump 47 having the suction thereof connected to a lubricant reservoir 49' to a passage 50 connecting with chamber 48 surrounding the parts described. Line 50 is equipped with a control valve 52 for regulating the pressure of the fluid so that it is at least 50 p.s.i. above the suction gas pressure in the machine. The machine is designed so that its normal operating range will assure pressure of the cooling fluid to the chamber within the range of 150 to 250 p.s.i. sufficient to assure flow across bushings 34.

In addition to the passage 50, there is provided passage 60 communicating with passages 40 and 42. Passage 60 communicates with the pump 47 supplying cooling fluid to passage 50 and includes a regulating valve 62 designed to maintain pressure at 100 p.s.i. above atmospheric pressure. Also included in line 60 is a shut-off valve 64 under the control of a solenoid.

In communication with chamber 48 is a vent passage 54. Vent passage valve 56 controls flow through the vent passage and vent passage restrictor 58 is provided to assure a pressure drop of a predetermined value through the passage.

Considering the operation of the lubrication and cooling system, when the compressor is receiving gas for transmission at an elevated pressure to a process facility, the lubrication and cooling system is operative to continuously supply cooling medium to chamber 48 via passage 50, and openings 23 at a pressure on the order of 50 p.s.i. over suction pressure. It will be understood valves 56 and 64 are closed during this period. As pointed out above this assures a supply of fluid in chamber 48 at a pressure sufficient to lubricate and cool bushings 34 with the fluid exhausting to atmosphere pressure in the vicinity of nut 49 for return flow to reservoir 49.

When it is desired to operate the compressor at suction pressures below the level at which fluid pressure in excess of that necessary to assure proper lubrication and cooling of bushings 34 is available, for example when a compressor normally employed in recycling hydrogen gas is used during a regeneration cycle, the operator opens valves 64 and 56. Fluid is passed by pump 47 to passage 60 at a pressure on the order of 100 p.s.i., in excess of atmospheric pressure. The passage 60 communicates with passages 40 and 42 supplying fluid for flow through both the inboard and outboard (relative to passage 42) bushings. The lower pressure from the second source, line 60, is sufficient because the flow is split into two streams, each of which must only pass one bushing. At the same time, fluid continues to flow through passage 50 at a pressure approximately 50 p.s.i. over machine suction pressure. Under the operating conditions encountered the suction pressure is considerably below normal design operating limit although in excess of the pressure of the fluid in chamber 48 via passages 40, 42 and 60. Thus, a small leakage of cooling fluid across the carbon ring 28 is assured. Fluid collecting in chamber 48, from both passage 50 and passage 60, is exhausted therefrom through vent line 54, past now open valve 56. Restriction 58 is provided to assure the desired pressure differential across the carbon ring 28. It will be apparent that a lubrication and cooling system for a sealing assembly that is operable over a variety of operating conditions has been provided. It will be further apparent that while the invention has been described with valves 56, 64 being hand-operated, these valves could be automatically operated responsive to suction pressure. With such an arrangement, the valves would open in response to a suction pressure slightly above that incapable of assuring the necessary fluid pressure drop across the bushing 34.

While I have described a preferred embodiment of the invention, it is to be understood the invention is not limited thereto since it may be otherwise embodied within the scope of the following claims.

I claim:

1. In combination with a compressor for receiving gas at a first pressure and discharging it at a second pressure; said compressor comprising a rotary shaft, bearing means supporting said shaft; sealing means including a stationary member and a member secured to said shaft rotationally engaging said stationary member to inhibit escape of gas from the compressor, and means for reducing the pressure of cooling fluid supplied to the sealing means; means for supplying cooling fluid at a relatively high pressure for flow to the sealing members and thereafter through the pressure reducing means, said means being effective to create predetermined leakage of cooling fluid across the engaging surfaces of the sealing means throughout a substantial portion of the operating range of the compressor and means, operable in response to a predetermined reduction in the pressure of the gas flow within the machine for supplying cooling fluid at a reduced pressure to the sealing members.

2. The combination set forth in claim 1 wherein said second cooling fluid supply means provides cooling fluid first to the cooling fluid presure reducing means.

3. The combination set forth in claim 1 wherein the first means for supplying cooling fluid is operative to supply same at a pressure in excess of the suction pressure of the compressor.

4. The method of supplying lubricating and cooling fluid to the sealing assembly of an elastic fluid machine wherein the sealing assembly includes a first section constituting a running seal and a second section constituting a pressure reduction section through which the fluid flows, which comprises the steps of:

(a) supplying the lubricating and cooling fluid at a pressure in excess of an operating pressure of the machine to the sealing assembly in a path, such that flow is diverted across the first section and then through the second section to a zone of reduced pressure, and (b) supplementing the supply of lubricating and cooling fluid by introducing additional lubricating and cooling fluid to the sealing assembly in response to a predetermined reduction in the operating pressure of the machine.

5. The method set forth in claim 4 wherein the last-mentioned step introduces the supplemental supply through a path that initially includes the second section of the sealing assembly.

6. The method set forth in claim 4 including the step of providing a separate passage for exhausting the fluid from the assembly when the supplemental flow is introduced.

References Cited

UNITED STATES PATENTS

| | | | |
|---|---|---|---|
| 2,854,927 | 10/1958 | Berg | 230—132 |
| 2,913,989 | 11/1959 | Boardman et al. | 277—15 |
| 2,928,685 | 3/1960 | Tracy | 277—3 |
| 3,235,269 | 2/1966 | Olesen | 277—1 |
| 3,236,529 | 2/1966 | Heim | 277—15 |
| 3,275,330 | 9/1966 | Rein et al. | 277—1 |
| 2,555,492 | 6/1951 | Kidney | 103—111 |
| 2,677,328 | 5/1954 | Vitek | 103—111 |
| 3,081,095 | 3/1963 | Hamrick | 103—111 |

FOREIGN PATENTS

| | | |
|---|---|---|
| 285,078 | 1/1965 | Netherlands. |
| 919,084 | 10/1954 | Germany. |

HENRY F. RADUAZO, Primary Examiner

U.S. Cl. X.R.

277—1, 3, 15; 415—170